(12) United States Patent
DeGooyer

(10) Patent No.: US 11,209,108 B2
(45) Date of Patent: Dec. 28, 2021

(54) DRAIN COUPLER WITH COMPRESSIBLE SEAL

(71) Applicant: Schluter Systems L.P., Plattsburgh, NY (US)

(72) Inventor: Lonnie DeGooyer, Herriman, UT (US)

(73) Assignee: Schluter Systems L.P., Plattsburgh, NY (US)

( * ) Notice: Subject to any disclaimer, the term of this patent is extended or adjusted under 35 U.S.C. 154(b) by 357 days.

(21) Appl. No.: 16/126,959

(22) Filed: Sep. 10, 2018

(65) Prior Publication Data

US 2020/0080672 A1 Mar. 12, 2020

(51) Int. Cl.

| F16L 21/08 | (2006.01) |
|---|---|
| F16L 17/067 | (2006.01) |
| F16L 55/11 | (2006.01) |
| F16L 5/10 | (2006.01) |
| E03F 5/04 | (2006.01) |

(Continued)

(52) U.S. Cl.
CPC ............ *F16L 21/08* (2013.01); *E03F 5/0408* (2013.01); *E04F 15/02188* (2013.01); *F16L 17/067* (2013.01); *F16L 55/1152* (2013.01); *E03C 1/284* (2013.01); *E03C 1/294* (2013.01); *F16L 5/02* (2013.01); *F16L 5/10* (2013.01)

(58) Field of Classification Search
CPC . F16L 21/08; F16L 17/067; F16L 5/00; F16L 5/14; F16L 37/02; F16L 21/007; E03F 5/0408; E03F 5/0407; E03F 5/0409; E04F 15/02188; E03C 1/284; E03C 1/294; A47K 3/405

USPC .............................. 285/80, 8, 42, 56, 55, 58
See application file for complete search history.

(56) References Cited

U.S. PATENT DOCUMENTS

| 1,782,737 A | 11/1930 | Mahon |
|---|---|---|
| 2,222,807 A | 11/1940 | Burr |

(Continued)

FOREIGN PATENT DOCUMENTS

| DE | 2035199 A1 | 1/1972 |
|---|---|---|
| DE | 2315574 A1 | 10/1974 |

(Continued)

OTHER PUBLICATIONS

Schluter Systems LP; "Schluter-KERDI-DRAIN with Integrated Bonding Flange for Bonded Waterproof Membrane;" www.schluter.com; (2004); 2 pages.

(Continued)

*Primary Examiner* — Matthew Troutman
*Assistant Examiner* — William S. Choi
(74) *Attorney, Agent, or Firm* — Jason Jones

(57) ABSTRACT

A drain coupler includes a drain coupler body having a lower opening and an upper opening. A pliable seal is carried by or adjacent the upper opening, the pliable seal operable to form a water-tight seal about an exterior of a metallic throat section of a drain. Coupler engagement structure is carried by the drain coupler adjacent the upper opening of the drain coupler body. Cap engagement structure is carried by a cap. The cap engagement structure and the coupler engagement structure cooperatively enable removable engagement of the cap over the upper opening of the drain coupler body to temporarily cover the upper opening of the drain coupler. The cap is removable to allow insertion of the metallic throat section in the pliable seal.

3 Claims, 4 Drawing Sheets

(51) Int. Cl.
*E04F 15/02* (2006.01)
*E03C 1/284* (2006.01)
*E03C 1/294* (2006.01)
*F16L 55/115* (2006.01)
*F16L 5/02* (2006.01)

(56) References Cited

U.S. PATENT DOCUMENTS

| | | | |
|---|---|---|---|
| 2,299,705 A | 10/1942 | Svirsky | |
| 2,672,205 A | 3/1954 | McDonald | |
| 3,668,718 A | 6/1972 | Cuschera | |
| 3,744,065 A | 7/1973 | Yavitch | |
| 3,839,752 A | 10/1974 | Brown et al. | |
| 3,896,511 A | 7/1975 | Cuschera | |
| 4,067,072 A | 1/1978 | Izzi | |
| 4,092,745 A | 6/1978 | Oropallo | |
| 4,099,274 A | 7/1978 | Emberson | |
| 4,123,810 A | 11/1978 | Oropallo | |
| 4,146,939 A | 4/1979 | Izzi | |
| 4,230,346 A * | 10/1980 | Gobel | 285/42 |
| D260,170 S | 8/1981 | Cornwall | |
| D263,866 S | 4/1982 | Messenger | |
| D273,413 S | 4/1984 | McMurray | |
| 4,455,693 A | 6/1984 | Cuschera | |
| 4,562,602 A | 1/1986 | Cuschera | |
| 4,694,513 A | 9/1987 | Kiziah | |
| 4,883,590 A | 11/1989 | Papp | |
| 4,964,180 A | 10/1990 | Harbeke | |
| 5,216,767 A | 6/1993 | Elmore | |
| D346,433 S | 4/1994 | Cooper | |
| 5,333,432 A | 8/1994 | Schlüter | |
| D379,493 S | 5/1997 | Woods | |
| 6,035,886 A | 3/2000 | Kerr | |
| 6,085,362 A | 7/2000 | Huber | |
| 6,212,709 B1 | 4/2001 | Newton | |
| 6,350,373 B1 | 2/2002 | Sondrup | |
| 6,381,775 B1 | 5/2002 | Sondrup | |
| D468,001 S | 12/2002 | Teskey | |
| 6,675,679 B2 | 1/2004 | Dugan | |
| D593,641 S | 6/2009 | Plank et al. | |
| 7,735,512 B1 * | 6/2010 | Ismert | E03F 5/0407 |
| 7,992,236 B2 | 8/2011 | Degooyer | |
| 8,060,956 B2 | 11/2011 | DeGooyer | |
| 8,112,827 B2 | 2/2012 | DeGooyer et al. | |
| 9,731,441 B2 | 8/2017 | DeJesus et al. | |
| 9,834,920 B2 | 12/2017 | Priester | |
| 2007/0056088 A1 | 3/2007 | DeGooyer | |
| 2007/0113329 A1 | 5/2007 | Luk | |
| 2007/0204399 A1 | 9/2007 | DeGooyer | |
| 2008/0022455 A1 | 1/2008 | McAlpine | |
| 2008/0229494 A1 | 9/2008 | DeGooyer et al. | |
| 2009/0113621 A1 | 5/2009 | DeGooyer et al. | |
| 2011/0308008 A1 | 12/2011 | DeGooyer | |
| 2012/0005873 A1 | 1/2012 | DeGooyer | |
| 2013/0025708 A1 | 1/2013 | Dallmer | |
| 2013/0160203 A1 * | 6/2013 | DeGooyer | E03F 5/0408 |
| 2014/0131996 A1 | 5/2014 | Murphy | |
| 2015/0152627 A1 * | 6/2015 | Ball | |
| 2015/0275497 A1 * | 10/2015 | Nyce | E03F 5/0409 |
| 2018/0030713 A1 * | 2/2018 | Howson | E03F 5/0408 |

FOREIGN PATENT DOCUMENTS

| | | |
|---|---|---|
| DE | 3442178 A1 | 5/1986 |
| DE | 4000511 A1 | 7/1990 |
| DE | 3907832 A1 | 9/1990 |
| DE | 4013775 A1 | 11/1991 |
| DE | 4206512 A1 | 9/1993 |
| MX | 2008010910 A | 9/2008 |
| WO | WO 2004042155 A1 | 5/2004 |
| WO | WO 2007016672 A2 | 2/2007 |

OTHER PUBLICATIONS

Schluter Systems LP; "Shower Receptor Wood or Metal Studs;" (Jul. 12, 2005); 1 page.

Dallmer GmbH & Co.; "IKZ Haus Technik;" Brochure; (Aug. 19, 1985); 1 page.

Schluter Systems LP; "Profile of Innovation—8.2 Schluter®—KERDI-DRAIN;" www.schluter.com; (Mar. 23, 2005); 4 pages.

* cited by examiner

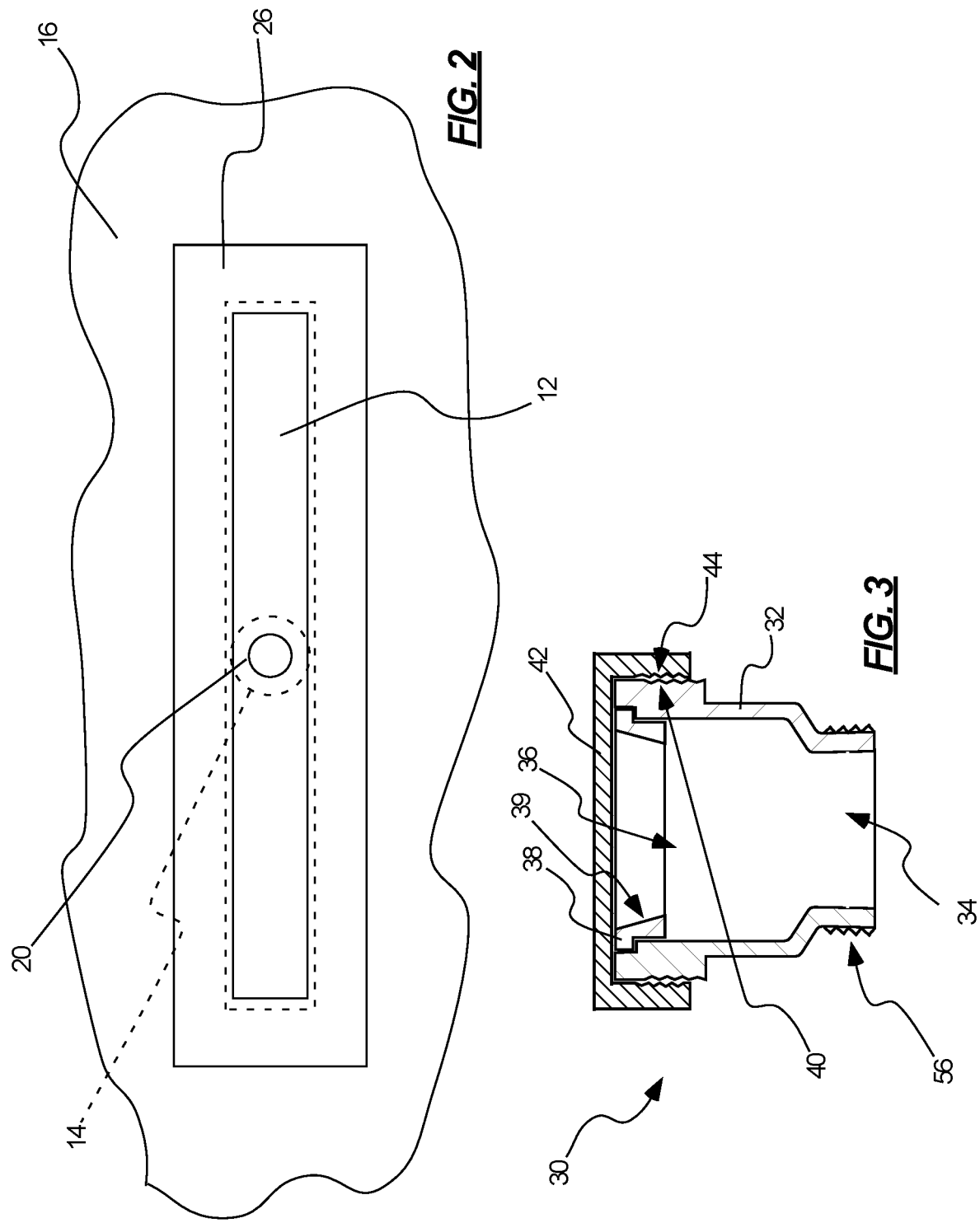

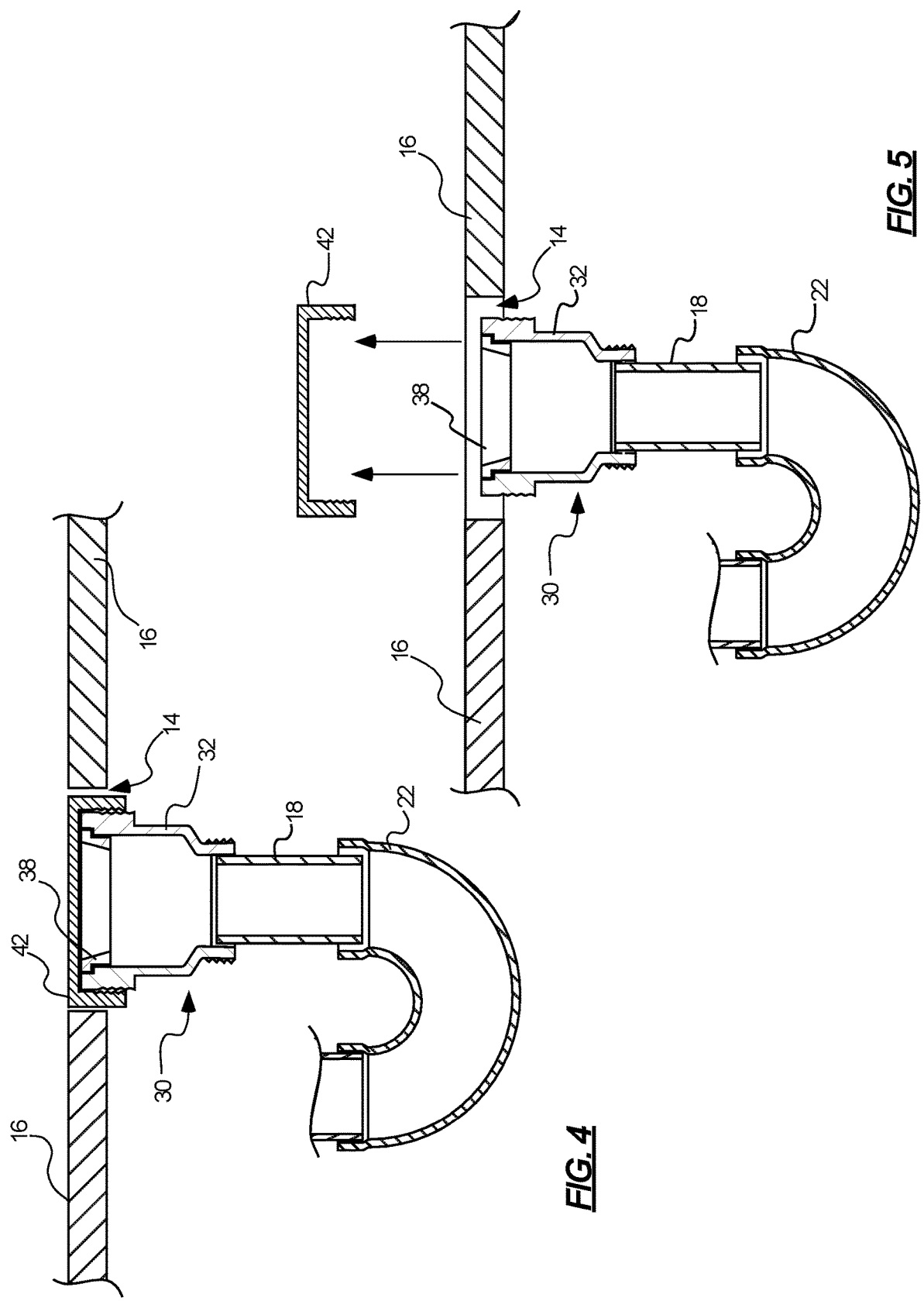

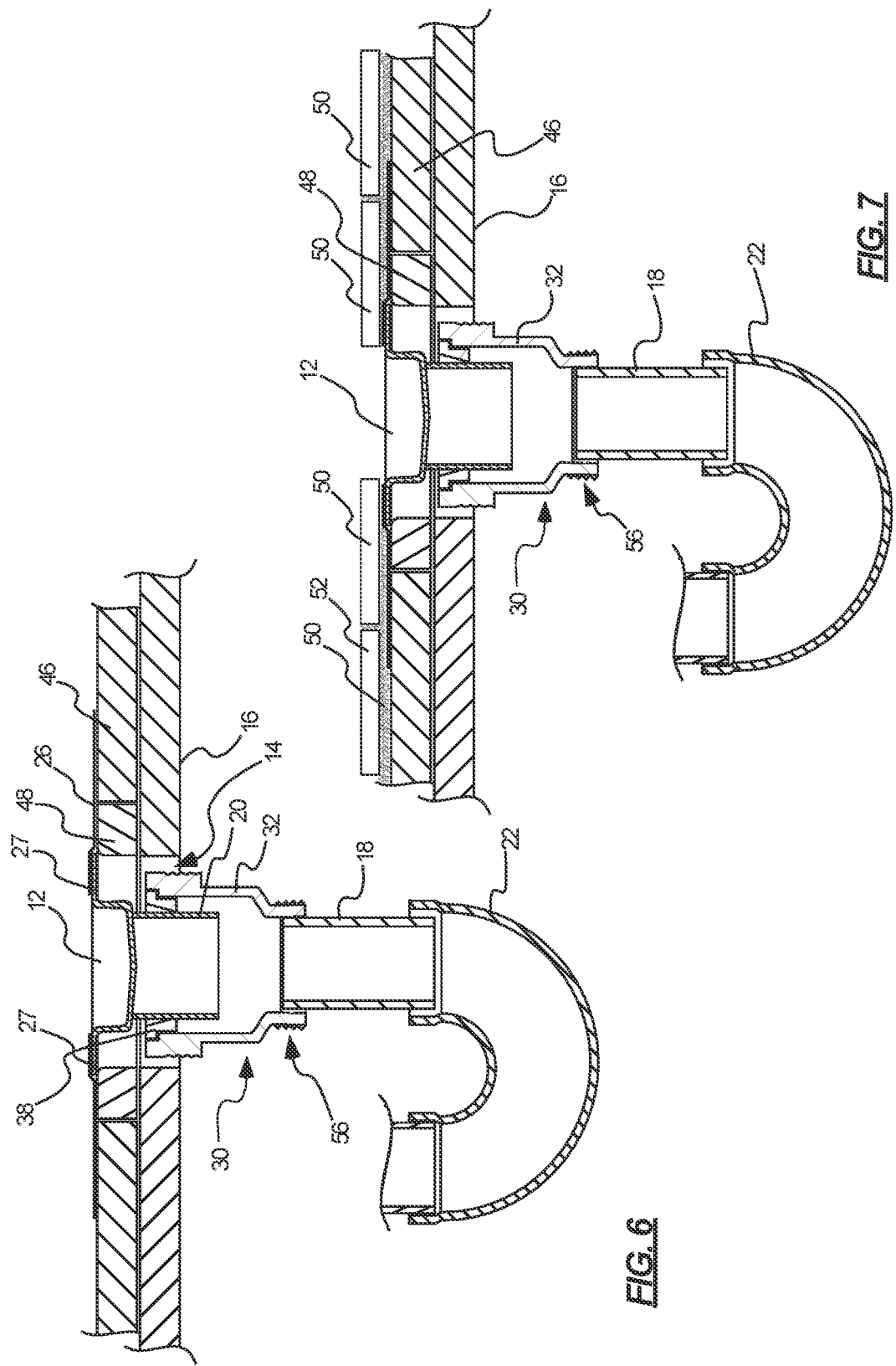

DRAIN COUPLER WITH COMPRESSIBLE SEAL

BACKGROUND OF THE INVENTION

Field of the Invention

The present invention relates generally to floor drain installations. More particularly, the present technology relates to floor drain installations incorporating metallic drains.

Related Art

Drains used in flooring installations are oftentimes formed from a metallic material, e.g., stainless steel and the like. While such drains have desirable performance characteristics, they are generally coupled to drainage systems that are formed from polymeric materials, such as ABS or PVC. Currently, there is no reliable manner of bonding metallic drains to polymeric drain lines. As such, when a coupling is desired between the two, a physical clamp is typically used, such as those known as Fernco® flexible couplers.

In such situations, the physical clamp coupler is attached to both the metallic drain component and a polymeric tail fitting, after which the tail fitting is bonded to the overall drainage system, which is typically polymeric. While the physical coupler thus provides a secure way of attaching the two components of dissimilar materials, this approach suffers from a number of problems.

SUMMARY OF THE INVENTION

In accordance with one aspect of the invention, a method of installing at least a portion of a flooring installation is provided. The method can include attaching a tail section to a drain coupler. The drain coupler can include: a drain coupler body having a lower opening and an upper opening, and a pliable seal carried by or adjacent the upper opening; coupler engagement structure carried by the drain coupler adjacent the upper opening of the drain coupler body; and a cap removably engaged with the coupler engagement structure and secured over the upper opening to temporarily cover the upper opening of the drain coupler, the cap being removable to allow insertion of a metallic throat section of a drain into the pliable seal. The tail section can be extended at least partially through an opening formed in a subfloor. The tail section can be attached to an existing drainage component coupled to a drainage system of a building such that the drain coupler and tail section are aligned with the opening formed in the subfloor. An upper portion of the cap can be aligned relative to an upper surface of the subfloor.

In accordance with another aspect of the invention, a drain coupler is provided, including a drain coupler body having a lower opening and an upper opening. A pliable seal can be carried by or adjacent the upper opening. The pliable seal can be operable to form a water-tight seal about an exterior of a metallic throat section of a drain. Coupler engagement structure can be carried by the drain coupler adjacent the upper opening of the drain coupler body. A cap can include cap engagement cap carried by the cap. The cap engagement structure and the coupler engagement structure can cooperatively enable removable engagement of the cap over the upper opening of the drain coupler body to temporarily cover the upper opening of the drain coupler. The cap can be removable to allow insertion of the metallic throat section in the pliable seal.

In accordance with another aspect of the invention, a flooring installation is provided, including an existing drainage component coupled to a drainage system of a building. A tail section can be coupled to the existing drainage component. A drain coupler can be coupled to the tail section, the drain coupler including a drain coupler body having a lower opening and an upper opening, and a pliable seal carried by the upper opening. A subfloor can have an opening formed therein, the drain coupler positioned to be aligned with the opening in the subfloor. A line drain can have a metallic throat section aligned with the opening in the subfloor and extending into the pliable seal, the pliable seal forming a water-tight seal about an exterior of the metallic throat section. Coupler engagement structure can be carried by the drain coupler adjacent the upper opening of the drain coupler body, the coupler engagement structure operable to removably engage a cap securable over the upper opening of the drain coupler body to temporarily cover the upper opening of the drain coupler. The cap can be removable to allow insertion of the metallic throat section in the pliable seal.

BRIEF DESCRIPTION OF THE DRAWINGS

The following drawings illustrate exemplary embodiments for carrying out the invention. Like reference numerals refer to like parts in different views or embodiments of the present invention in the drawings.

FIG. 2 is a top view of a line drain positioned above a subfloor;

FIG. 3 is a side, sectioned view of a drain coupler in accordance with an embodiment of the invention;

FIG. 4 is an end, partially sectioned view of the drain coupler of FIG. 3 installed on an existing drainage system and positioned within an opening in a subfloor;

FIG. 5 is an end view of the installation of FIG. 4 after a cap is removed from the drain coupler;

FIG. 6 is an end view of the installation of FIG. 5, with a line drain installed within the drain coupler; and FIG. 7 is an end view of a tile installation utilizing the drain coupler of the present technology.

DETAILED DESCRIPTION

Figure 1:
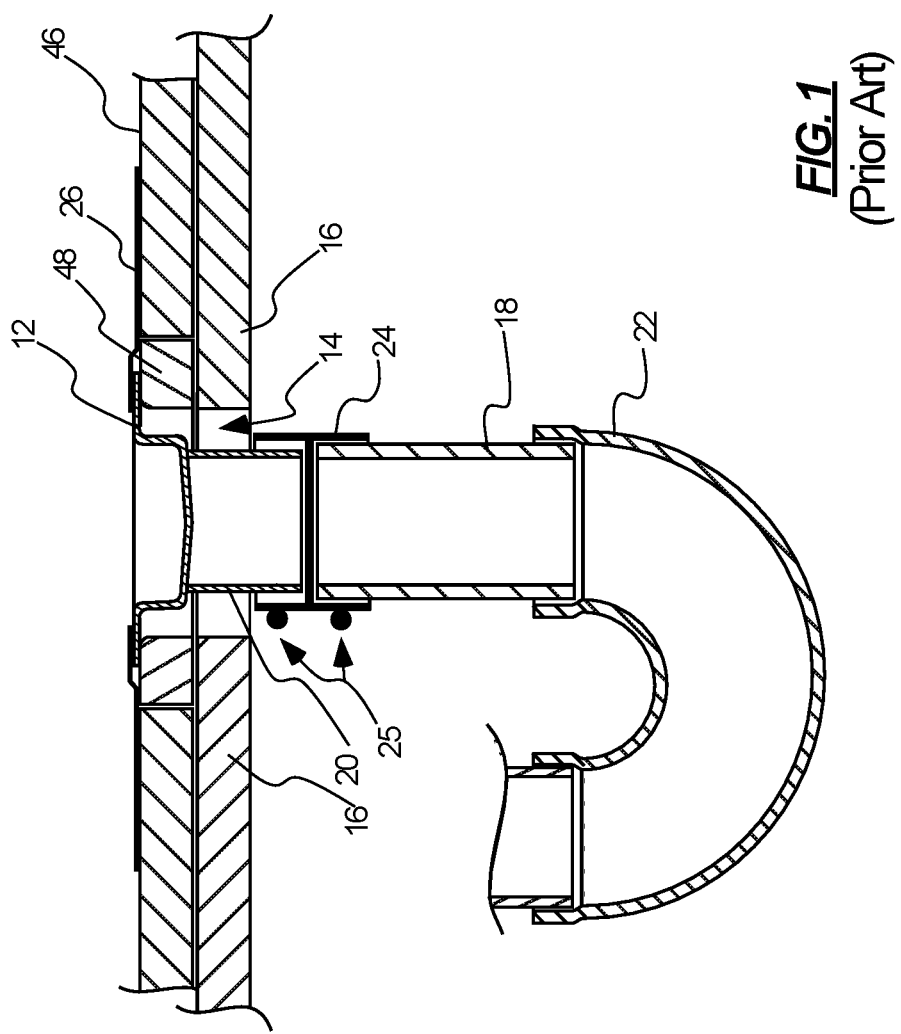
FIG. 1 is an end view of a portion of a PRIOR ART flooring installation.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Definitions

As used herein, the singular forms "a" and "the" can include plural referents unless the context clearly dictates otherwise. Thus, for example, reference to "a bondable waterproof membrane" can include one or more of such membranes, if the context so dictates.

As used herein, the term "substantially" refers to the complete or nearly complete extent or degree of an action, characteristic, property, state, structure, item, or result. As an arbitrary example, an object that is "substantially" enclosed is an article that is either completely enclosed or nearly completely enclosed. The exact allowable degree of deviation from absolute completeness may in some cases depend upon the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. As another arbitrary example, a composition that is "substantially free of" an ingredient or element may still actually contain such item so long as there is no measurable effect as a result thereof.

As used herein, components can be referenced as "permanently" or "removably" coupled or attached to one another. As those terms are used herein, two or more components that are permanently attached to one another cannot be separated without damaging one or more of the components, or without damaging the structure or material used to couple them. Two or more components that are removably attached to one another can be separated without significantly damaging any of the components.

As used herein, a "tail" section or component is a segment of pipe or conduit used to bridge two or more drainage components. While reference is made to "a" tail section, it is understood that such a section may include one, two or more pipe sections. In other words, a singular "tail" may include two pipe components coupled one to another.

As used herein, the term "bondable (or bonded) waterproof membrane" refers to a membrane that typically bonds directly to a mortar bed or shower tray (or a suitable equivalent) that protects the mortar bed or shower tray (and any underlying structure such as the subfloor) from contact with moisture from the shower. Such membranes are well known, such as the version commercially sold under the trademark "Kerdi."

As used herein, the term "about" is used to provide flexibility to a numerical range endpoint by providing that a given value may be "a little above" or "a little below" the endpoint.

Relative directional terms can sometimes be used herein to describe and claim various components of the present invention. Such terms include, without limitation, "upward," "downward," "horizontal," "vertical," etc. These terms are generally not intended to be limiting, but are used to most clearly describe and claim the various features of the invention. Where such terms must carry some limitation, they are intended to be limited to usage commonly known and understood by those of ordinary skill in the art in the context of this disclosure.

While a good faith effort has been made to accurately depict relative dimensions of various components in the figures, the figures may present components in a manner that is slightly enlarged or reduced in size to more accurately convey the principals of the present technology.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Invention

The present technology relates generally to a drain coupler and related systems that can be used to ensure that line drains and other metallic drains are securely coupled to a drainage system of a building, dwelling or other structure in which the drain is to be installed. FIG. 1 illustrates (in end view) portions of a prior art line drain installation. In this system, a line drain 12 is provided that is installed though an opening 14 in a subfloor 16. A tail section 18 must be coupled to the throat 20 of the line drain in order to couple the drain to an existing drainage system of a building or structure within which the drain is installed. In the example shown, the existing drainage system includes a P-trap 22, which is in turn coupled to other components of the drainage system, eventually draining out of the building or structure.

Because the line drain 12 is typically formed of a metallic material, generally stainless steel, a prior art coupler 24 has typically been used to mate the stainless steel line drain with the generally polymeric drainage components (that is, the tail, P-trap, etc. are typically formed from a hard plastic material such as PVC or ABS). This coupler is generally rubber and includes a pair of hose clamps having screws 25 that must be tightened to secure the throat of the line drain and the tail within the coupler. This is typically done independently of (e.g., above) the subfloor 16, prior to installation of the drain through the subfloor.

Once the tail 18 has been secured to the throat 20 of the drain 12 via coupler 24, the tail must be coupled to the P-trap 22. Due to the use of the tail with the coupler, the location at which a polymer (the tail) is bonded to another polymer (the P-trap) is moved significantly below the surface of the subfloor. Thus, this joint cannot be bonded or glued prior to extending the tail through the subfloor, it must be done afterward. Because the opening 20 through the subfloor 16 is relatively small, it is very difficult, sometimes impossible, for the installer to view the actual coupling joint between the tail and the P-trap. This can result in the tail being improperly seated within, or coupled to, the P-trap. In the event of any backflow pressure, this condition can cause the drain to leak, which can result in significant damage to the dwelling or building in which the drain is installed.

FIG. 2 illustrates this visibility problem in more detail. In a typical scenario, the line drain 12 includes a throat 20, and a body section that is much larger than the opening 14 formed in the subfloor 16. As an added complication, many times a bondable waterproof membrane 26 is applied to an upper (and also sometimes a lower) portion of the flanges (27 in FIG. 6) extending from the line drain body. The installer typically folds the bondable waterproof membrane up and over the body of the line drain during installation. It will thus be appreciated that the overall structure of the line drain obscures an installers' view of the opening in the subfloor through which the drain throat and tail 18 must be inserted to couple the tail to the P-trap 22.

FIG. 3 illustrates an exemplary embodiment of the present technology that alleviates the problems discussed above. In this example, a coupler 30 can generally include a drain coupler body 32 which can include a lower opening 34 and an upper opening 36. A pliable seal 38 can be carried by or adjacent to the upper opening. The pliable seal can be operable to form a water-tight seal about an exterior of the metallic throat section (20 in FIG. 6) of a line drain (12 in FIGS. 6 and 7).

The drain coupler 30 can include coupler engagement structure 40 which can be carried by the drain coupler adjacent the upper opening 36 of the drain coupler body 32. The engagement structure can be, for example, threads formed on or in the drain coupler body. A cap 42 can include cap engagement structure 44, which can similarly be threads formed on or in the cap. The cap engagement structure and coupler engagement structure can be configured to cooperatively enable removable engagement of the cap over the upper opening of the drain coupler body. In this manner, the cap temporarily covers the upper opening of the drain coupler while being removable to allow insertion of the metallic throat section of the drain into the pliable seal.

FIGS. 4 through 6 illustrate a progressive series of configurations of the drain coupler 30. In FIG. 4, the drain coupler has first been coupled to tail section 18. An installer can then insert the coupler and the tail assembly through opening 14 formed in subfloor 16. An upper surface of the cap 42 can be aligned relative to an upper surface of the subfloor, based upon the length of the tail section 18 (that is, the installer can size the tail to ensure a proper elevation of the cap). Thus, once installed, the coupler and tail section assembly can be securely attached to the P-trap 22, with the cap positioned level with the upper surface of the subfloor, or slightly higher than the upper surface of the subfloor.

Once installed in the manner shown in FIG. 4, the installation can remain as shown for a period of time, if desirable or necessary. For example, the process shown in FIG. 4 may be completed by a plumber who can then leave the installation for further work by the tile setter. While remaining in this state, the installation can withstand the stresses experienced by any such installations during construction or remodeling around and above the installation. Also, the cap ensures that unwanted debris does not enter the drainage system as additional work is performed around or over the installation.

When it is desired to complete the installation during the tile setting process, an installer can remove the cap 42, as shown in FIG. 5. As the cap can be threadably secured to the coupler 32, an installer can simply unscrew the cap and remove it. The engagement structure on both the cap and the coupler can include structure other than threads: suitable examples include, without limitation, slots and tabs, a mild press fit, etc. In any case, the tile setter can easily remove the cap, often without requiring specialized tools, and install a line drain 12 as shown in FIG. 6. Due to the design of the pliable seal 38, it is a simple matter for the tile setter to slide the throat 20 of the line drain into the pliable seal, which makes a water-tight, but removable and adjustable seal against the throat. This mating can be done by the installer with a high level of confidence in the resulting seal between the two components.

In the embodiment shown in FIG. 6, a shower tray or mortar bed 46 has first been installed over the subfloor 16, as is commonly done in such installations. The shower tray or mortar bed can include an opening formed therein roughly corresponding to the opening 14 formed in the subfloor. Additional spacing or support material 48 can be placed beneath the line drain 12 to support the line drain, as is known in the art. Once these materials are in position, the tile setter can very easily lower the line drain 12 until the throat 20 is securely engaged within the pliable seal 38. In this manner, the installer can ensure that the drain is properly sealed relative to the coupler, even with zero visibility of the coupler beneath the drain. Where necessary, the seal created between the throat and the membrane can allow for relative height adjustment between the two, to enable the installer to snugly press the line drain against supporting structure.

The figure views provided are generally side, sectioned views of the drain coupler 30. As will be appreciated, the pliable seal 38 is generally formed as a ring that that generally circumscribes the upper opening (36 in FIG. 3) of the drain coupler body 32. The seal can be bonded to the body 32 of the coupler; or press fit, or "snapped" into position about the body. The pliable seal can extend into an inner barrel of the drain coupler body and can include an internal wall 39 that slopes inward toward a center axis of the drain coupler body: that is, an upper opening of the seal is generally larger than a lower opening. The pliable seal can be formed from a material that allows it to elastically compress in response to be deformed by the throat 20 of the line drain. Suitable examples of material from which the pliable seal can be formed include, without limitation, silicone, thermoplastic rubber, and the like. This sloped wall can allow the throat 20 of the line drain 12 to be easily forced downward into the coupler, and serves to center the throat within the coupler.

In the examples shown in the figures, the coupler 30 is generally bonded to the tail section 18. In some embodiments, however, the coupler can be configured to mate with a tail section of different composition than the coupler. For example, the coupler may be formed from PVC (polyvinylchloride) but is to be installed on a P-trap formed of ABS (Acrylonitrile Butadiene Styrene). In this case, the tail section can be formed from ABS and the drain coupler can include lower threaded engagement structure (56 in FIG. 3) that can be operable to threadably engage the tail section. In this example, the tail section would include internal threads (not shown) to engage the external threads 56 on the coupler.

FIG. 7 illustrates a completed flooring installation utilizing the drain coupler of the present technology. As will be appreciated by one of ordinary skill in the art having possession of this disclosure, after installation of the drain 12, the bondable waterproof membrane (26 in FIG. 6) can be secured above the supporting materials 46, 48. Additional membranes (not shown) can be installed over the membrane 26. A mortar or other adhesive 50 can be applied above the entirety of the installation, after which tiles or other veneer materials 52 can be installed.

In addition to the structure discussed above, the present technology also provides methods of installing flooring installations. In one example, the method can include attaching a tail section to a drain coupler, the drain coupler including: a drain coupler body having a lower opening and an upper opening, and a pliable seal carried by or adjacent the upper opening; coupler engagement structure carried by the drain coupler adjacent the upper opening of the drain coupler body; and a cap removably engaged with the coupler engagement structure and secured over the upper opening to temporarily cover the upper opening of the drain coupler, the cap being removable to allow insertion of a metallic throat section of a line drain into the pliable seal. The tail section can be extended at least partially through an opening formed in a subfloor. The tail section can be attached to an existing drainage component coupled to a drainage system of a building such that the drain coupler and tail section are aligned with the opening formed in the subfloor. An upper portion of the cap can be aligned relative to an upper surface of the subfloor. When desired, the cap can be removed to provide access to the drain coupler and a metallic throat section of a line drain can be inserted into the pliable seal, the pliable seal forming a water-tight seal about an exterior of the metallic throat section.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the examples.

I claim:

1. A drain coupler, comprising:
   a drain coupler body having a lower opening and an upper opening;
   a pliable seal carried by the drain coupler body, the pliable seal operable to form a water-tight seal about an exterior of a metallic throat section of a drain;
   the pliable seal being formed in a ring and being bonded directly to and extending downwardly into an inner barrel of the drain body, the pliable seal circumscribing the upper opening of the drain body and terminating in an upper portion substantially flush with an upper surface of the drain body, the pliable seal including a sloped internal wall that slopes toward a center axis of the drain coupler body such that an upper opening of the seal is larger than a lower opening of the seal;
   coupler engagement structure carried by the drain coupler adjacent the upper opening of the drain coupler body;
   a cap;
   cap engagement structure carried by the cap, the cap engagement structure and the coupler engagement structure cooperatively enabling removable engagement of the cap over the upper opening of the drain coupler body to temporarily cover the upper opening of the drain coupler, the cap being removable to allow insertion of the metallic throat section in the pliable seal.

2. The coupler of claim 1, wherein the internal wall of the pliable seal is compressible by the throat of the drain as the throat is inserted into the pliable seal.

3. The coupler of claim 1, wherein the drain coupler body further includes lower threaded engagement structure operable to threadably engage a tail section.

* * * * *